Figure 1:
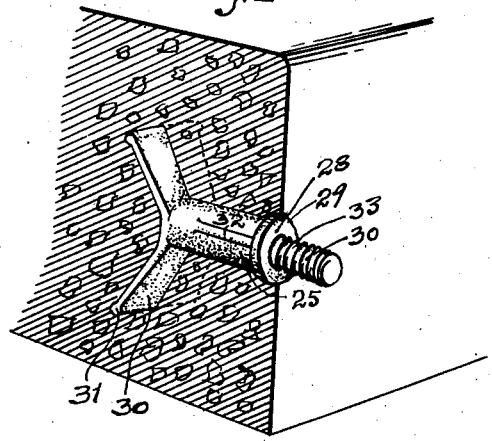

July 4, 1944.  C. H. WESTCOTT  2,352,673
DOWEL BAR STRUCTURE

Filed April 6, 1942

INVENTOR.
BY Clifford H. Westcott
Banning & Banning
Attorneys.

Patented July 4, 1944

2,352,673

UNITED STATES PATENT OFFICE 2,352,673

DOWEL BAR STRUCTURE

Clifford H. Westcott, Oak Park, Ill., assignor to James H. Jacobson, Chicago, Ill.

Application April 6, 1942, Serial No. 437,769

3 Claims. (Cl. 94—17)

My present invention relates to the construction of bridges, masonry and concrete structures, and particularly to the building of highways and concrete pavements, and more particularly to a dowel bar and its bearing, the dowel bridging the space between and structurally connecting the adjoining faces of adjacent concrete slabs, transferring road loads from one concrete slab to the next adjoining.

This is a continuation in part of my application Serial No. 22,308, filed May 20, 1935, since issued under date of October 20, 1943, as Patent No. 2,299,670.

In the past, it has been the custom to dowel across the space between adjoining slab faces even when mechanical joints were omitted, the dowel, in this case, serving the additional purpose of providing a tie between the slabs to restrict their movements. The common dowel, economical due to its inherent shape, has many disadvantages. Among these is its lack of bearing, which accounts for funneling within the slab with the resultant loss of practically all bearing value.

It is, however, the province of the common dowel to first acquire a portion of the superimposed load of vehicular travel, and to carry this portion of the load across the gap between the faces of the adjoining slabs and then to distribute the load from the loaded slab to the adjoining slab.

It is therefore a paramount object of my invention to first provide for load transfer between adjoining slabs; and (a) To maintain the surface of the adjoining slabs uniform and in substantially the same plane so as to obtain a comparatively smooth and uninterrupted surface for the motoring public; and (b) To reduce the high bearing stresses existing at the edge of the slab by providing a greater bearing area in contact with the concrete at the edge of the slab; and (c) To further reduce the high edge stresses by virtue of radiating anchors or fins which either absorb load or transmit and distribute the dowel loads to and within the slab and thereby eliminate high stress areas in the slab that would otherwise exist; and (d) To avoid a shorter effective length of structural dowel member whereby the deflection of the dowel is materially reduced; and (e) To decrease the deflection of the short dowel during periods of load transmission by furnishing a definite structural support for the body of the dowel, which not only eliminates channeling within the slab, but by so doing also decreases deflection under periods of load transmission; and (f) To increase the load transmission capacity of the common dowel, as a dowel used for the purpose of load transmission is required to withstand bending and shearing stresses, and I materially reduce these bending stresses in a dowel by effectively reducing the length of the bar; and (g) To increase the load transmission capacity of the dowel by virtue of this reduction in length with the consequent increased capacity in bending. Due to this shorter length and consequent smaller deflection the load transfer capacity of the dowel is considerably increased, the amount of increase depending upon the thickness of the slab and the modulus of the subgrade reaction; and (h) To provide a load transmission device which will serve as a tie-bar and structurally connect the adjoining slab ends or faces and restrict the relative movement of the slabs; to limit the upward curling or warping of the slab edge; and to reinforce the slab against local bending; and (i) To produce a unit which is adaptable for installation where one slab is poured subsequent to the pouring of the adjoining slab, such as where one traffic lane is finished before the adjoining lane is poured; or in patch work and work of that nature.

My present invention has these and other objects, all of which are explained in detail and may be more readily understood when read in conjunction with the accompanying drawing (one sheet), which illustrates the preferred embodiment of my invention, it being manifest that changes and modifications may be resorted to without departure from the spirit of the claims forming a part hereof. And while I describe my invention in its preferred embodiment, it is to be understood that the words I use are words of description and not of limitation.

Figure 2:
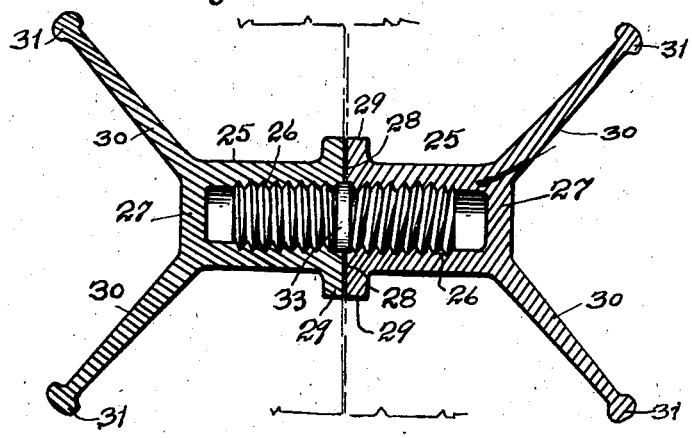

Figure 1 is a perspective view of one of the bearing members shown half-embedded in a concrete road slab partially shown in section and with one end of the threaded dowel member protruding therefrom; and Fig. 2 is a longitudinal vertical section through the complete structure.

The structure illustrated involves the application of my invention to a roadway slab, and for purpose of description only I choose to define my invention as applied to this particular construction; however, I wish it understood that its adoption and use are equally applicable to any poured or precast structure, whether it be a roadway slab or a retaining wall, dam, or building structure, for, as a matter of fact, it is applicable to an almost unlimited number of structures.

In the form shown the structure consists of a pair of counterpart and relatively reversed rigid bearing sleeves 25 standing in opposed relation to one another, each of which consists of a single casting adapted to be positioned, one on each side of the joint, and adapted to be successively embedded within the respective slabs on opposite sides of the joint. Each sleeve is of cup-like formation and threaded on its interior, the threading of the opposed sleeves being in reverse relation to afford right and left threads 26. The outer end of each sleeve is sealed with a wall 27, whereas the inner end 28 is reinforced with a surrounding bearing flange 29, the face of which lies approximately flush with the face of the slab section. Oppositely disposed radial arms 30—30 are cast integral with the rear end of the sleeve and diverge therefrom and approach (but do not penetrate) the surface, top and bottom of their respective slabs. The outer ends of the arms are enlarged as at 31, to establish bulb-like sections which serve as anchors to assist in preventing the movement of the bearing surface within the slab. And lateral fins 32 are provided, which likewise radiate from the bearing sleeve 25 and taper downwardly to a point approaching the sealing wall 27, thereby increasing the bearing surface at the face of the slab, and providing also for load distribution into the body of the slab.

The bearing sleeves are connected by a dowel 33 reversely threaded at its opposite ends and resembling a stud-bolt, and the interior of the cuplike sleeve portion of each bearing member receives the dowel as shown, one sleeve being screwed onto the dowel on each end thereof. This assembly is most effective where the slabs comprising the adjacent lanes of a road are poured at different times, and little if any appreciable space is left between the adjoining slab faces as illustrated. In pouring a row, spaced apart sleeves 25 are preferably, but not necessarily, secured to a bulkhead or form by means of common bolts which are passed through holes in the form and screwed into the sleeve, drawing the inner end face of the sleeve up flush with the form, and are held rigid and cast in this position. Later the form is removed, first removing the common bolts, the dowel 33 substituted for the bolt, the associated sleeve 25 screwed onto the protruding end of the dowel, and the second or adjoining concrete road slab cast in place.

In this form, the dowel 33 has an increased bearing surface within the sleeve member 25, due to the additional surface provided by the threads, and the connection between the dowel and sleeve is materially strengthened.

In operation and as the moving wheel load approaches the joint in traveling from the initially loaded slab towards the next adjacent slab, the load is absorbed by the dowel bar bearing through the radial arms 30 and fins 32 and flange 29, and then transmitted to the sleeve 25 and dowel 33 and thence across the joint to a like unit on the opposite side in the next adjacent slab, where the concentrated load is dissipated through the sleeve and the radial arms and fins and then distributed into the slab structure. As the load crosses the joint and onto the next adjacent slab, the reverse of the above action starts at a maximum and diminishes as the load passes on. The short dowel remains at all times at or near the neutral axis of the slabs, whereas the flanges and fins remain within the tension and compression areas intersecting the shear planes and reinforcing the edge of the slab.

This action of the dowel structure absorbs and so distributes the load, that if failure occurs it will take place outside of the field embraced by the dowel bar structure, thus effectively transmitting the full strength of one slab to the other without interruption; in fact, the employment of this structure insures the highway joint against joint failures, as the slab here is stronger at the joint than any other point. The fins 32 and flanges 29 increase the bearing value of the sleeve 25 in the concrete and assist in the distribution of load to such an extent as to prevent channeling of the concrete structure.

The foregoing description applies to poured concrete—cast in situ; but precast concrete, art marble, imitation stone, glass, terra cotta, and many similar products, are gaining favor in the building industry of today. Many times these preferred products would be used in places where they are not now used if it were possible to effectively transmit a load from one to the next adjoining section. My invention is equally applicable to such or similar fields of work.

I claim:

1. That improvement in the art of highway construction which comprises a load transfer device for bridging the gap between and structurally joining the adjacent ends of concrete road slabs, said device consisting of two substantially counterpart and relatively reversed rigid major members, each having its parts adapted to be imbedded in its respective slab, each major member comprising an internally threaded sleeve portion opening at the face of the slab in which that member is imbedded, and anchors extending from the sleeve portion and into the body of the slab within which it is imbedded, a bridging member comprising a bolt with threads on the respective ends adapted to have one end screwed into the internally threaded sleeve portion of one major member and adapted to project beyond the face of its respective slab and to bridge the gap intervening between the adjoining slab faces and adapted to the internally threaded sleeve portion of the other associated major member screwed onto the projecting end of the bolt.

2. That improvement in the art of highway construction which comprises a load transfer device for bridging the gap between and structurally joining the adjacent ends of concrete road slabs, said device consisting of two substantially counterpart and relatively reversed rigid major members, each having its parts adapted to be imbedded in its respective slab, each major member comprising an internally threaded sleeve portion opening at the face of the slab in which that member is imbedded, and provided around the open end with an enlarged bearing flange adapted to be flush with the face of the slab within which it is imbedded, a bridging member comprising a bolt with threads on the respective ends adapted to have one end screwed into the internally threaded sleeve portion of one major member and adapted to project beyond the face of its respective slab and to bridge the gap intervening between the adjoining slab faces and adapted to have the internally threaded sleeve portion of the other associated major member screwed onto the projecting end of the bolt.

3. That improvement in the art of highway construction which comprises a load transfer device for bridging the gap between and structurally joining the adjacent ends of concrete road slabs, said device consisting of two substantially counterpart and relatively reversed rigid major members, each having its parts adapted to be imbedded in its respective slab, each major member comprising an internally threaded sleeve portion opening at the face of the slab in which that member is imbedded, and provided around the open end with an enlarged bearing flange adapted to be flush with the face of the slab within which it is imbedded, a bridging member comprising a bolt with reversed threads on the respective ends adapted to have one end screwed into the internally threaded sleeve portion of one major member and adapted to project beyond the face of its respective slab and to bridge the gap intervening between the adjoining slab faces and adapted to have the internally threaded sleeve portion of the other associated major member screwed onto the projecting end of the bolt.

CLIFFORD H. WESTCOTT.